May 9, 1933.    R. H. BEHREND ET AL    1,908,503

PRESSURE INDICATOR

Filed April 22, 1929    2 Sheets-Sheet 1

INVENTORS
Robert H. Behrend,
BY and Wilburn L. Day
Arthur E. Brown
ATTORNEY

May 9, 1933.  R. H. BEHREND ET AL  1,908,503
PRESSURE INDICATOR
Filed April 22, 1929    2 Sheets-Sheet 2

INVENTORS
Robert H. Behrend
BY Wilburn L. Day
Arthur C. Brown
ATTORNEY

Patented May 9, 1933

1,908,503

UNITED STATES PATENT OFFICE

ROBERT H. BEHREND AND WILBURN L. DAY, OF BELOIT, KANSAS

PRESSURE INDICATOR

Application filed April 22, 1929. Serial No. 357,162.

Our invention relates to pressure indicators and more particularly to devices for indicating the degree of inflation of an automobile tire, the principal objects of the invention being to display indications of pressure conditions in a tire, to vary the intensity of an indicating light proportionately to variations in pressure in a tire, and to separately indicate the air pressures in the several tires of an automobile.

A further object of the invention is to provide a visible and continuous tire inflation indicator assuring disclosure of the pressure condition in each of the tires of an automobile.

In accomplishing these and other objects of the invention, we have provided improved details of structure, the preferred forms of which are illustrated in the accompanying drawings, wherein.

Figure 1:
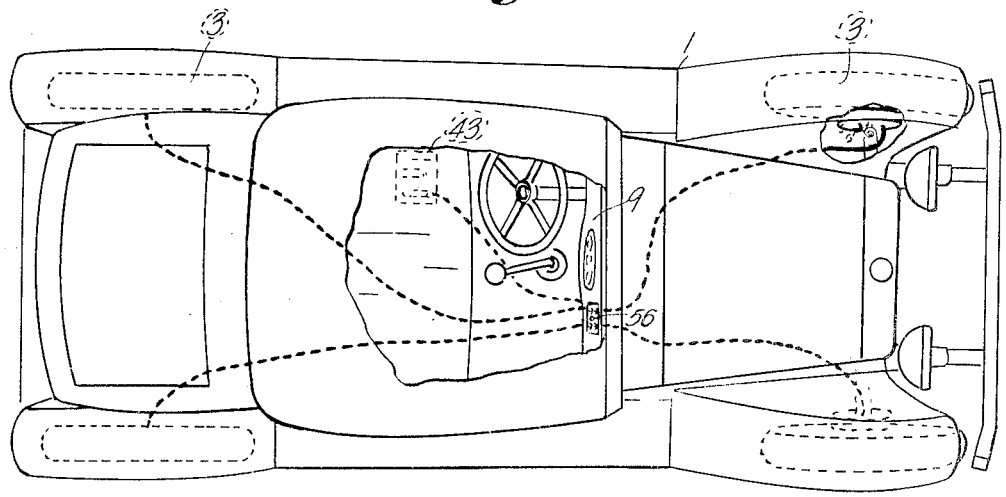
Fig. 1 is a plan view partly diagrammatic of an automobile equipped with our invention, covering members being partly broken away to better illustrate structure, and circuits being shown by heavy dotted lines.
Figure 2:
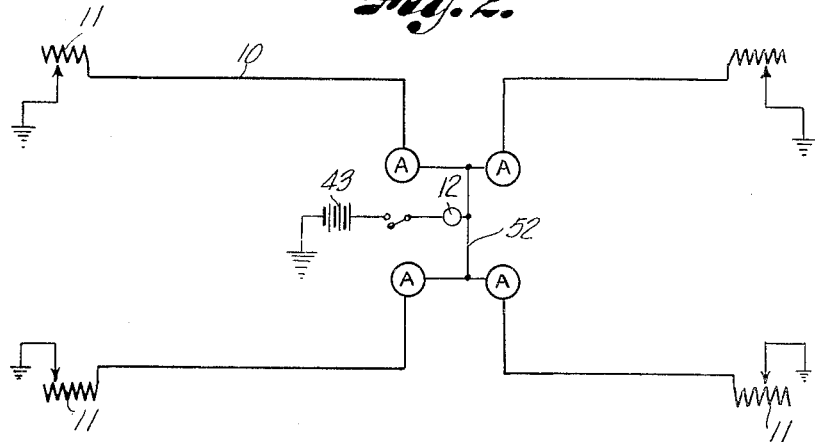
Fig. 2 is a diagrammatic view of circuits including indicators, a battery, a lamp, and devices connected with the wheels of the automobile for indicating pressure of air in the tires.
Figure 3:
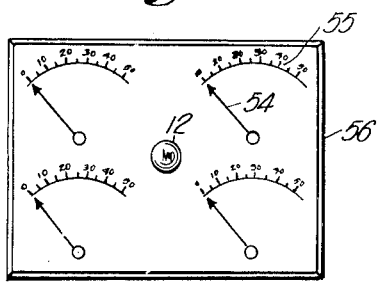
Fig. 3 is a front view of an indicator.

Referring in detail to the drawings:

1 designates an automobile including an axle 2, wheels 3, tires 4 containing tubes 5 mounted on the wheels, and tubular valve stems 6 communicating with the tubes through which air under pressure may be introduced for inflating the tires.

The automobile further includes brake drums 7 fixed to the wheels and disks 8 fixed to the axle housing closing the ends of the brake drums.

The elements thus described are common in automobiles, and illustrate a support, a rotating member, and a member subject to pressure, to which my pressure indicating device may be applied.

Since the members associated with each wheel are similar, only one will be particularly described.

Our device later described in detail is adapted for displaying the indications of tire pressure conditions on the dash 9 of the automobile. A circuit 10 is provided including a rheostat 11 mounted on the wheel and a lamp 12 on the dash 9. A bellows or expansible member 13 also mounted on the wheel and influenced by the pressure of air in a tube controls the rheostat, the intensity of the light varying proportionately to variation of pressure of air in the tube.

The rheostat and bellows are preferably mounted in the drum which rotates with the wheel so that the expansive movement of the bellows and movement of the rheostat contact arm are in directions at right angles to the direction of centrifugal force generated by the rotating wheel. A flexible conduit or hose 14 has one end mounted on the valve stem for providing communication with the tube and the other end is mounted on a corrugated nipple 15 of the bellows, whereby the pressure of the air in the inflated tube may expand the bellows and pressure may be exerted without wasting air or permitting escape of the air.

The rheostat includes a coil of wire 16 wound spirally on a cylinder and extending longitudinally thereof, and the rheostat and bellows are preferably mounted in a housing 17 with the threaded conductive stem or post 18 of the rheostat mounted in an insulating bushing 19 fixed in an opening 20 of a side wall 21 of the housing, and the nipple 15 of the bellows extending in an adjacent opening 22 of said wall 21.

The stem and nipple project through respective openings 23 and 24 provided in the vertical brake drum wall 25, and a connector wire 26 fixed to the projecting stem 18 of the rheostat has its other end 27 fixed to a projecting post or screw 28 mounted in a bushing 29 in a third opening 30 of the brake drum wall.

The screw 28 is a conducting member and represents means for attaching a contact ring 31 to the inner face of the brake drum wall, the ring being insulated from the wall and conductively connected with the rheostat through the wire 26 and with the lamp as presently described.

The housing has lateral flanges 32 provided with openings 33 to receive bolts 34 for securing the same to the brake drum, and thus extends laterally into the brake drum. The housing is carried around by the drum upon rotation of the wheel, so that pressure of air in the tube exerted through the sylphon may vary the resistance of the rheostat and thus control the circuit.

A contact terminal eye member 35 on the end of a wire 36 representing the circuit 10 is fixed to a threaded end 37 of a tubular socket or casing 38 mounted in an opening 39 of the fixed disk 8 and insulated therefrom by a bushing 40, and a brush 41 slidable in the tubular member, is urged by a spring 42 into contact with the ring 31 maintaining conductive connection between the rheostat and the lamp.

The circuit leads to a battery 43 from one side of the light and from the other side leads through said contact member 35, brush, and ring, to the rheostat.

A conductive rocking arm or lever 44 is pivoted at one end on a conductive pin 45 mounted in the housing adjacent the sylphon and in such position that a stem 46 of the sylphon will bear against the lever adjacent its lower end. The outer end of the lever is urged by a spring 47 anchored at 48 to the wall 21 of the housing toward the sylphon so that when deflation of the tube occurs due to puncture or other causes and reduced pressure causes collapse of the bellows, the lever will rock toward the sylphon for a purpose presently disclosed.

A brush-like resilient arm 49 has one bent end 50 fixed to said rocking arm 44 adjacent the outer end thereof, and an opposite end 51 bent arcuately to form a lug-like brush or finger engaging the rheostat and slidable longitudinally over the series of convolutions of the wire, whereby the arm 49 closes a circuit from the rheostat through the rocking arm 44 and pivot pin 45 to the housing for grounding the circuit in the frame of the automobile.

Each of the wheels is provided with apparatus of the character just described including the frame-grounding arm conductively and movably engaged with the rheostat, and a circuit branch 52 leading through a movable indicator and the lamp to a battery 43 grounded in the frame of the automobile.

Pointers 54 are movable over scales 55 for indicating the resistance offered by the rheostats due to the particular positions of the spring-pressed fingers 51 that slide on the rheostat coils.

Movable indicators such as ammeters, scales and lamps are preferably mounted on a single board 56 secured to the dash so that the ammeters and lamp constantly influenced by pressure of air in the tubes will be constantly visible to the driver for continuously indicating the degree of inflation of the tires.

Figure 6:
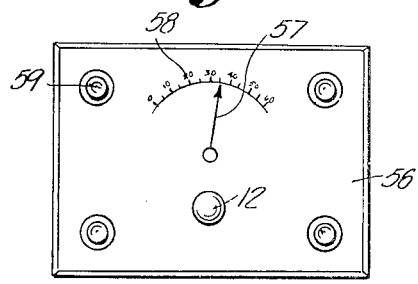
Fig. 6 is an elevation of a modified form of indicator.
Figure 4:
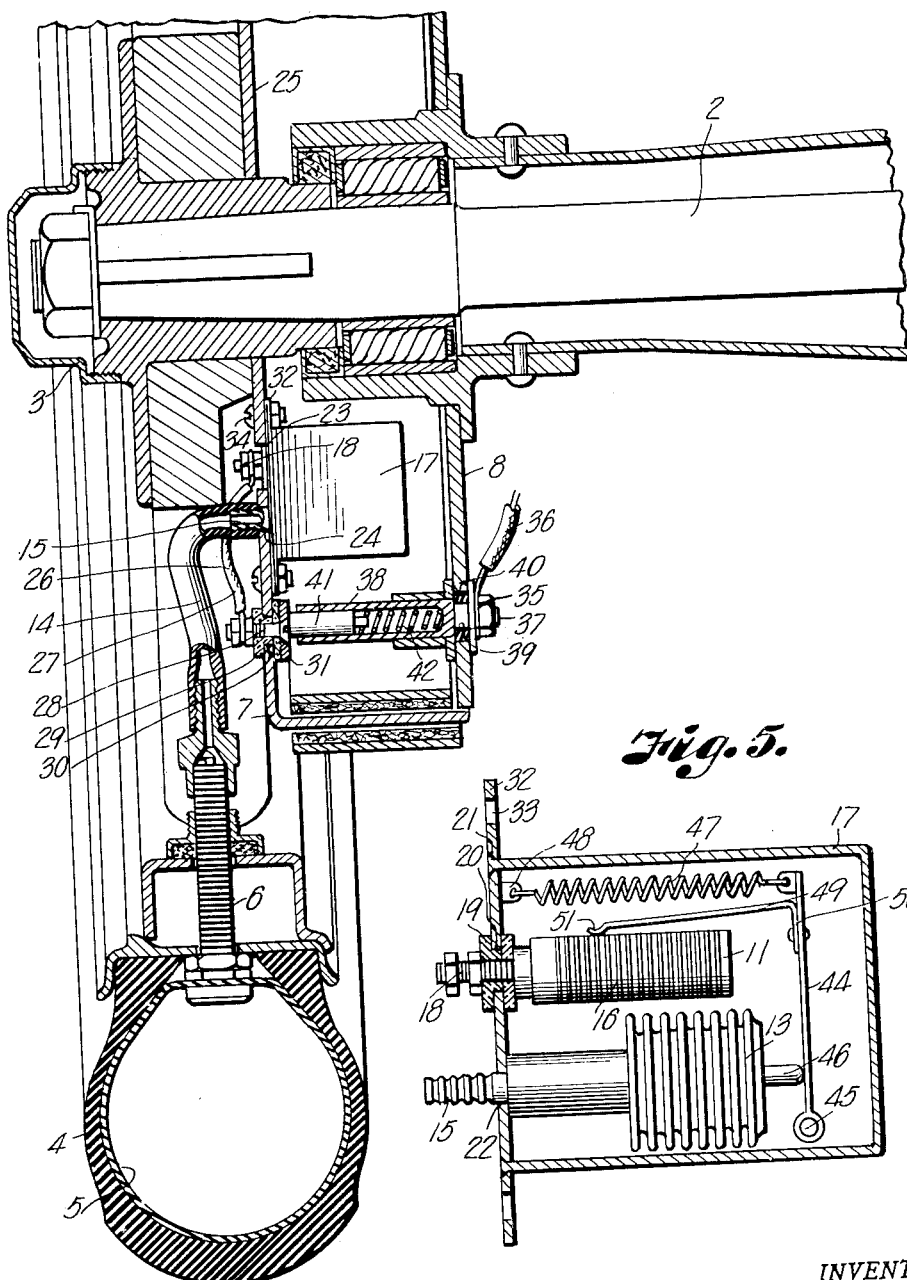
Fig. 4 is an enlarged central section of a wheel and axle and apparatus controlled by the pressure of air in the tires for controlling a circuit for varying the indications of the indicator.
Figure 5:
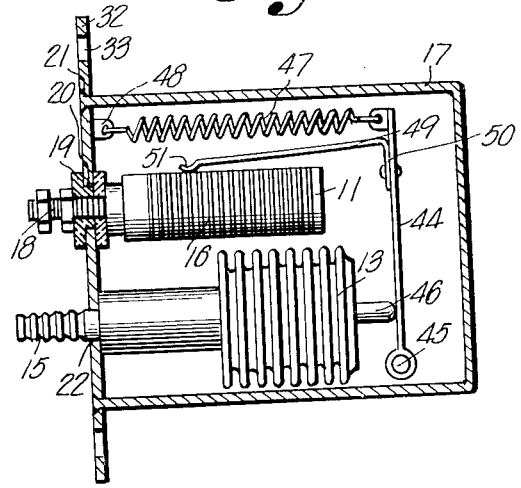
Fig. 5 is an enlarged longitudinal section of a casing supported by a brake drum and containing a rheostat connected with the circuit to a lamp and movable indicators, and a bellows communicating with the tire for controlling the rheostat.

In the modified form of board shown in Fig. 6 one movable indicator having a pointer 57 and a single scale 58, are provided, and switches 59 are provided for closing the circuit branches of the several rheostats to energize the lamp and movable indicator.

In the use of the modified form, the lamp is normally not energized and when a switch is closed to connect one of the conductors into the lamp circuit the light shines with an intensity proportionate to the degree of pressure in the tire to which the switch is related.

In using a device when each of the wheels is provided with the devices described and a separate ammeter is connected with each device, the pressure of air in the tubes expands the several bellows and urges the levers 44 outwardly against the resistance of the springs 47. The displacement of the upper ends of the levers 44 causes the fingers 51 of arms 49 to move toward the outer ends of the rheostats and include relatively extensive portions of the coiled wires in the circuits, whereby resistance to the current produced by the battery is reduced proportionately to the pressures in the tubes, and the light shines with an intensity directly proportionate to these pressures.

The driver may then by noting the condition of the light, determine the condition of his four tires as to inflation, and if the illumination is below a degree of intensity which he knows to be normal he is informed that one or more of the tires has lost air.

The several scales may then be inspected to ascertain which tire has lost air, since each scale identifies a tire and the pointer indicates thereon the resistance offered by the related rheostat in the brake drum of the affected tire.

The variations in the intensity of the light and indications of the movable indicators result from collapse of the bellows due to withdrawal of pressure, whereby the arm 44 urged by the spring 47 is permitted to move towards the rheostat and the brush-like finger 51 moves to reduce the amount of wire included in the circuit and thus increase the resistance to the flow of current through the rheostat.

What we claim and desire to secure by Letters Patent is:

1. In combination with a rotary mounting, a pressure actuated mechanism adapted to be subjected to centrifugal force generated by the rotary mounting including a pressure actuated bellows, means for supporting the bellows on the mounting so that the direction of expansion of the bellows is at right angles to the direction of centrifugal force, an elongated resistance element, means for supporting said resistance element on the mounting in parallel relation with the bellows, a lever arm operable by the bellows, means for pivotally supporting the lever arm on said mounting transversely to the resistance element, and a resilient brush fixed to the arm and movable along the resistance element in a direction parallel to the movement of the bellows and in a plane at right angles to the direction of centrifugal force.

2. In combination with a rotary mounting, a pressure actuated mechanism adapted to be subjected to centrifugal force generated by the rotary mounting including a pressure actuated bellows, means for supporting the bellows on the mounting so that the direction of expansion of the bellows is at right angles to the direction of centrifugal force, an enlongated resistance element, means for supporting said resistance element on the mounting in parallel relation with the bellows, a lever arm engageable by the bellows, means for pivotally supporting the lever arm on said mounting transversely to the resistance element, a resilient brush fixed to the arm and movable along the resistance element in the longitudinal direction thereof and in a plane at right angles to the direction of centrifugal force, a tube communicating with the bellows for delivering a pressure medium thereto for moving the brush in one direction along the resistance element, and a spring engaging the arm to move the brush in the opposite direction.

In testimony whereof we affix our signatures.

ROBERT H. BEHREND.
WILBURN L. DAY.